Aug. 26, 1924.
E. G. GEREKE
CARDBOARD CONTAINER
Filed April 24, 1922
1,505,999
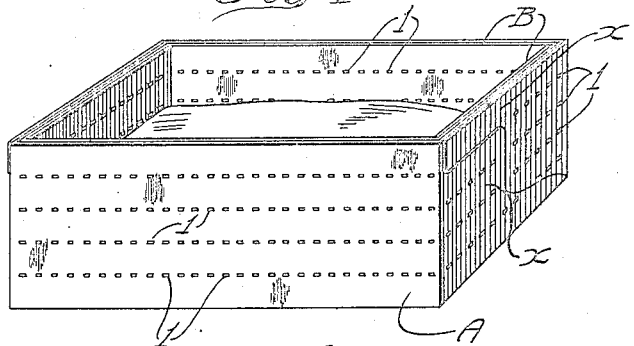
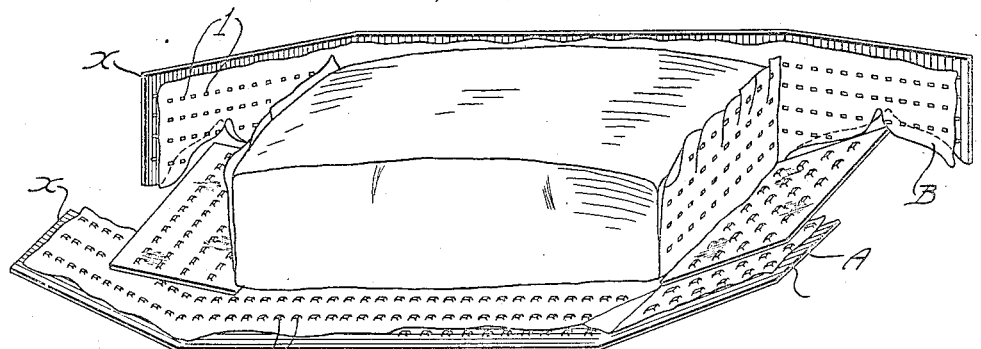
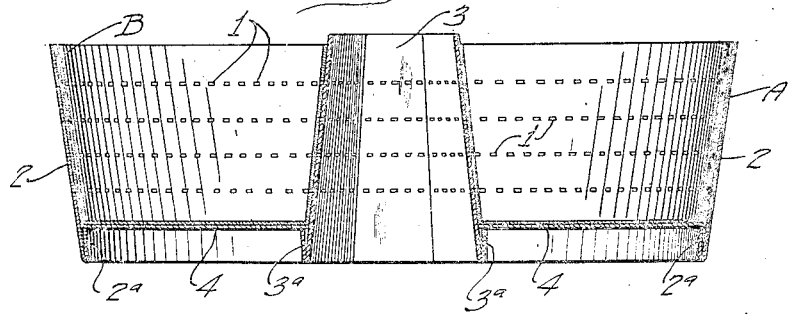
INVENTOR
Edward G. Gereke
By Bakewell & Church
ATTORNEYS Patented Aug. 26, 1924.

1,505,999

UNITED STATES PATENT OFFICE.

EDWARD G. GEREKE, OF ST. LOUIS, MISSOURI.

CARDBOARD CONTAINER.

Application filed April 24, 1922. Serial No. 556,161.

*To all whom it may concern:*

Be it known that I, EDWARD G. GEREKE, a citizen of the United States, residing at St. Louis, Missouri, have invented a certain new and useful Improvement in Cardboard Containers, of which the following is a full, clear, and exact description, such as will enable others skilled in the art to which it appertains to make and use the same.

This invention relates to a cardboard container of the general type described in my U. S. Patent No. 1,437,512, dated Dec. 5, 1922, namely, a combined baking utensil and wrapper for a baked article consisting of an outer shell of cardboard or the like provided with an inner lining of parchment paper or the like that is secured to said outer shell by a substance which permits the inner lining to separate automatically or pull away from the outer shell when the container is subjected to heat.

When a container of the kind above referred to is used as a baking utensil for bakery products of a spongy or fluffy nature, such as angel cake, the sides of the cake baked in the container usually do not conform accurately to the side walls of the container, but in most instances, sag, contract or bulge inwardly, thereby producing a baked article whose outer surface is not smooth, symmetrical and even. While I am not able to explain why bakery products like angel cake act in this manner when baked in a receptacle or container composed of an outer cardboard shell provided with a paper inner lining that separates from the outer shell during the baking operation, I have discovered that if small holes or orifices are formed in the vertically-disposed portion of the container, such, for example, as the side walls, bakery products like angel cake can be baked satisfactorily in such containers without liability of the sides of the cake sagging or bulging inwardly. Therefore, I claim to have originated a new and useful baking utensil for angel cake and bakery products of a similar nature, which, in its simplest form, consists of a container formed of flexible cardboard or similar material provided with an inner lining of thin, flexible paper and having numerous orifices or small holes formed in the vertically-disposed portion or portions of the container.

Figure 1 of the drawings is a perspective view of a container constructed in accordance with my present invention, showing how the inner lining adheres to the outer shell when the dough or other material to be baked is first placed in the container.

Figure 2 is a perspective view, showing the inner lining separated from the outer shell and the inner lining and shell partly stripped off the baked article; and Figure 3 is a vertical transverse sectional view of a container that is adapted to be used for baking a ring cake or other article of annular form.

In Figures 1 and 2 of the drawings A designates the outer shell of my improved container, which is preferably composed of flexible cardboard or other similar sheet material, and B designates an inner lining of flexible parchment paper or other suitable material that is secured to the inner face of said shell. The inner lining B is secured to the outer shell A in such a way that it will adhere tightly to said shell when the wet dough is first placed in the container and also during the first part of the baking operation, thus eliminating the possibility of the inner lining wrinkling or sagging over the dough, and will separate automatically from the outer shell during the baking operation, thus facilitating the removal of the container from the baked article. Preferably, paraffin is used for securing the inner lining to the outer shell of the container on account of the fact that paraffin will cause the inner lining to cling tightly to the shell when the container is cold, but will permit the inner lining to separate automatically or pull away from the outer shell during the baking operation, thereby enabling the container to be easily removed from the baked article by first taking off or pulling away the outer shell and then stripping off the inner lining from the baked article, it being possible to do this without liability of damaging the baked article or pulling chunks out of the sides of same, due to the fact that the inner lining is formed from thin paper. I do not wish it to be understood, however, that paraffin is the only substance that can be used for securing the inner lining to the outer shell of the container, the essential thing being to use a substance that will act as an adhesive when the dough is first placed in the container, but whose adhesive properties will be destroyed when the container is subjected to the temperature usually existing in a baking oven.

As shown in Figures 1 and 2, the vertically-disposed portion of the container, such, for example, as the side walls, are provided with numerous orifices or small holes 1 that extend through the inner lining and outer shell. When a container of the above construction is used for baking bakery products of a spongy or fluffy nature, such as angel cake, the sides of the cake will conform accurately to the side walls of the container, due to the fact that the orifices 1 in the side walls of the container prevent the cake from sagging or bulging inwardly at points in proximity to said side walls.

The particular type or construction of the container is immaterial, but I prefer to construct the outer shell A of the container like an ordinary folding cardboard box and combine the inner lining B with the sheet of cardboard that constitutes said outer shell before said sheet is cut and scored, the preferred method being to arrange a sheet B of parchment paper or other suitable thin paper upon a sheet A of cardboard or the like, connect said sheets together by paraffin or some other substance of a similar nature, then cut and score or crease said connected sheets so as to form a box blank provided with co-operating interlocking portions x, and thereafter fold said blank and connect the interlocking portions x of same together so as to produce a container that is capable of holding dough or other material that is to be baked. This method of constructing the container makes it possible to manufacture the container at a very low cost, owing to the fact that the inner lining B is arranged in operative position and combined with the outer shell A in a single operation when the sheets constituting said inner lining and shell are flat. It also enables a large number of blanks from which containers can be formed to be shipped and stored in a small space, due, of course, to the fact that the containers are flat before they are set up.

In Figure 3 of the drawings I have illustrated a container embodying my invention that is adapted to be used for baking a ring cake or baked article of annular form. Said container embodies all of the desirable features and characteristics of the container illustrated in Figures 1 and 2, and is composed of an outer shell A formed of cardboard or other suitable material and an inner lining B formed of parchment paper or other suitable thin paper secured to the inner surface of said outer shell by paraffin or any other suitable material that will permit said inner lining to separate, pull away from or become detached from the outer shell during the baking operation, but which insures said inner lining adhering tightly to the outer shell when the dough is first placed in the container and during the first part of the baking operation. The container shown in Figure 3 comprises a side wall portion 2 provided with perforations or orifices 1, a centrally-disposed, tubular-shaped member 3, which may or may not be perforated, and a bottom 4, which may or may not be perforated, sustained by ledges $2^a$ and $3^a$ at the lower end of the side wall portion 2 and the tubular-shaped member 3, respectively. In order that a large number of containers may be packed in a small space, the side wall portion 2, the bottom 4 and the tubular-shaped member 3 of the container are detachably connected together and said side wall portion and tubular-shaped member are each constructed similar to a folding box, namely, formed from a strip or flat piece that is bent or folded into shape at the time the various parts of the container are combined or assembled.

The particular shape or form of the orifices 1 is immaterial, but I prefer to form said orifices in such a manner that the portions of the inner lining surrounding said orifices bulge inwardly, and thus virtually form a series of projections on the inner side of the lining of the baking utensil.

Having thus described my invention, what I claim as new and desire to secure by Letters Patent is:

1. A baking utensil composed of an outer shell constructed of flexible cardboard, and a flexible paper inner lining arranged in engagement with the inner side of said shell and connected to same by a means which permits said inner lining to separate from the shell when the utensil is subjected to heat, the side wall portions of said shell and inner lining having aligned perforations.

2. A baking utensil composed of an outer shell constructed of flexible cardboard, and a flexible paper inner lining for said shell connected to the inner side of same by a means which permits said inner lining to separate from the shell when the utensil is subjected to heat, the side wall portions of said shell and lining having perforations and also projections that extend inwardly.

EDWARD G. GEREKE.